US012675474B1

(12) United States Patent
Chauhan et al.

(10) Patent No.: US 12,675,474 B1
(45) Date of Patent: Jul. 7, 2026

(54) GENERATE CUSTOMIZED DATA VISUALIZATION FROM NATURAL LANGUAGE QUERY

(71) Applicant: Amazon Technologies, Inc., Seattle, WA (US)

(72) Inventors: Anuj Chauhan, New York, NY (US); Wuwei Lan, Princeton Junction, NJ (US); Rishav Chakravarti, White Plains, NY (US); Patrick Ng, Great Neck, NY (US); Jerry Lin, New York, NY (US); Stephen Michael Ash, Seattle, WA (US); William Michael Siler, Germantown, TN (US); Chris Elliott, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/962,392

(22) Filed: Nov. 27, 2024

(51) Int. Cl.
| | |
|---|---|
| *G06F 7/00* | (2006.01) |
| *G06F 16/242* | (2019.01) |
| *G06F 16/2452* | (2019.01) |
| *G06F 16/248* | (2019.01) |
| *G06F 16/26* | (2019.01) |
| *G06F 40/30* | (2020.01) |

(52) U.S. Cl.
CPC ...... *G06F 16/24522* (2019.01); *G06F 16/243* (2019.01); *G06F 16/248* (2019.01); *G06F 16/26* (2019.01); *G06F 40/30* (2020.01)

(58) Field of Classification Search
CPC .. G06F 16/214; G06F 16/9577; G06F 16/953; G06F 16/288; G06F 16/2237; G06F 16/285; G06F 16/9538; G06F 16/9038;

G06F 16/338; G06F 16/9535; G06F 16/248; G06F 16/243; G06F 16/26; G06F 16/24522; G06F 16/3347; G06F 16/3344; G06F 16/332; G06F 16/3322; G06F 16/35; G06F 16/2456; G06F 16/2465; G06F 16/2471; G06F 16/24575; G06F 16/24578; G06F 16/2453; G06F 16/2457; G06F 40/10; G06F 40/20; G06F 40/30; G06F 8/436
See application file for complete search history.

(56) References Cited

U.S. PATENT DOCUMENTS

| | | | | |
|---|---|---|---|---|
| 11,093,492 | B1 * | 8/2021 | Nair | G06F 16/24522 |
| 11,216,474 | B2 * | 1/2022 | Pandey | G06F 16/2455 |
| 2020/0073983 | A1 * | 3/2020 | Sen | G06F 16/243 |
| 2022/0206786 | A1 * | 6/2022 | Silva | G06F 8/36 |

* cited by examiner

*Primary Examiner* — Mohammad A Sana
(74) *Attorney, Agent, or Firm* — Knobbe, Martens, Olson & Bear, LLP

(57) ABSTRACT

Systems and methods are provided for natural language query processing and data visualization generation. The system can analyze the natural language query for semantic attributes and compare the semantic attributes against the semantic data of a set of data visualizations to generate context for the natural language query in the form of a personalized set of semantic data. Based on the semantic attributes and the semantic data, the system can select a set of exemplars that best match the natural language query and using the exemplars, and a library specification, generate library specification programming code for generating a structured query to resolve the natural language query. Based on the results of the structured query, the system can generate a data visualization as a response to the natural language query.

20 Claims, 7 Drawing Sheets

_304A_

```
<schema>
CREATE TABLE <tableName>(
<col0> : country, attribute
<col1> : revenue, number
<col2> : date, time
<col8> : continent, attribute
);
</schema>
```
306A

```
<question>
What are the 2024 sales by country for North America?
</question>
```
308A

```
<code>
library.add_metric(operand_id='<col1>', aggregation=NonPeriodicAggregations.Sum)
library.add_groupBy(operand_id='<col0>')
library.add_category_filter(operand_id='<col8>', function=filterFunction.exact('North America')
library.add_date_range_filter(operand_id='<col2>', minimum='2024-01-01', maximum='2024-12-31')
</code>
```
310A

_304B_

```
<schema>
CREATE TABLE <tableName>(
<col0> : country, attribute
<col1> : sales, number
<col2> : date, time
);
</schema>
```
306B

```
<question>
What are the global sales by year?
</question>
```
308B

```
<code>
library.add_metric(operand_id='<col1>', aggregation=NonPeriodicAggregations.Count)
library.add_groupBy(operand_id='<col2>', time_granularity=TimeGranularity.Year)
</code>
```
310B

_304C_

```
Example:
<schema>
CREATE TABLE <tableName>(
<col1> : student id, attribute , identifier
<col2> : score, marks, attribute , integer
<col5> : teacher id, attribute , identifier
);
</schema>
```
306C

```
<question>
Average scores by student name
</question>
```
308C

```
<code>
libary.add_metric(operand_id='<col2>', aggregation=NonPeriodicAggregations.Average)
libary.add_groupby(operand_id='<colx>') # Using <colx> as student name is not in the schema
</code>
```
310C

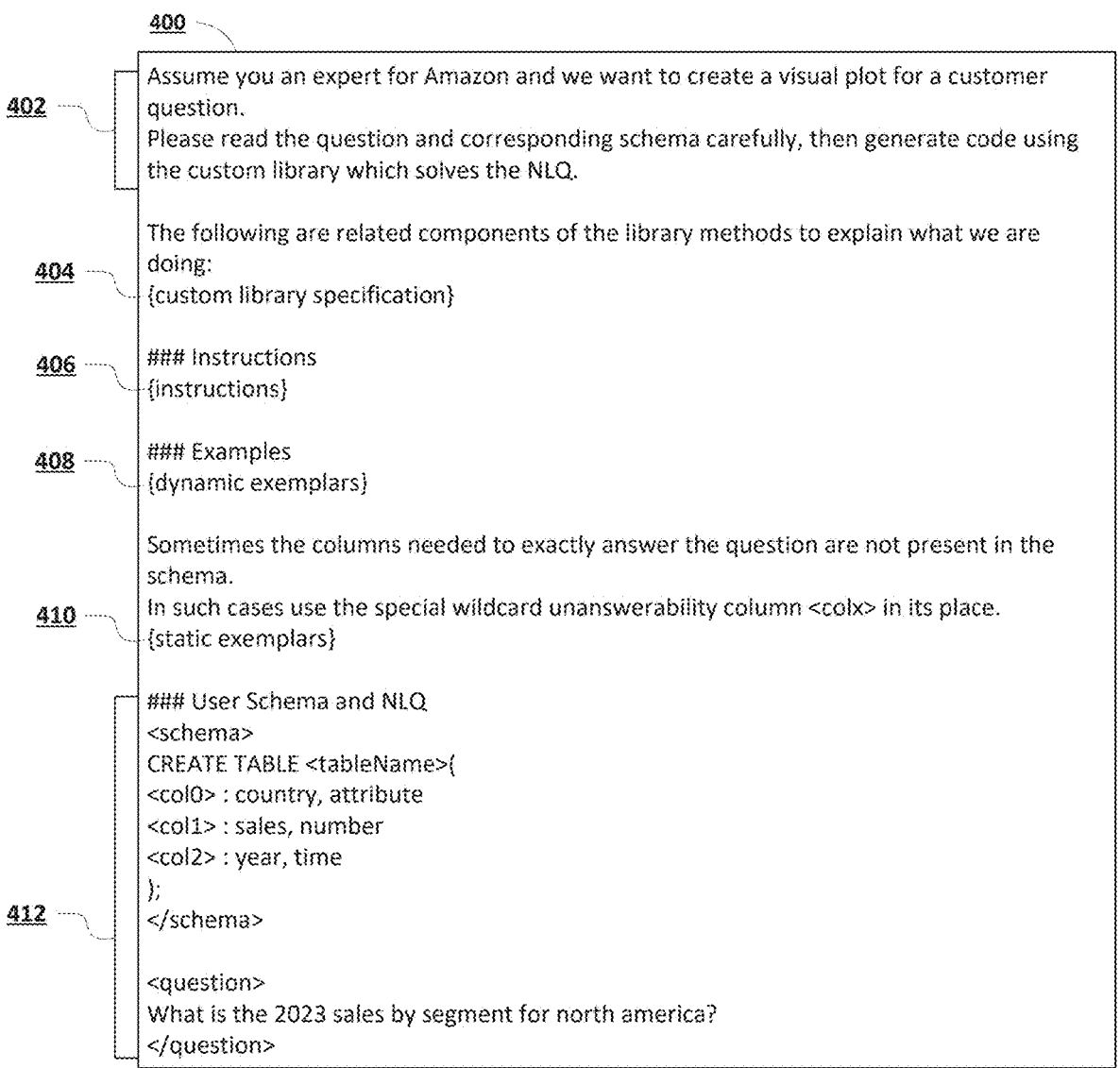

402 — Assume you an expert for Amazon and we want to create a visual plot for a customer question.
Please read the question and corresponding schema carefully, then generate code using the custom library which solves the NLQ.

404 — The following are related components of the library methods to explain what we are doing:
{custom library specification}

406 — ### Instructions
{instructions}

408 — ### Examples
{dynamic exemplars}

410 — Sometimes the columns needed to exactly answer the question are not present in the schema.
In such cases use the special wildcard unanswerability column <colx> in its place.
{static exemplars}

412 — ### User Schema and NLQ
```
<schema>
CREATE TABLE <tableName>{
<col0> : country, attribute
<col1> : sales, number
<col2> : year, time
};
</schema>

<question>
What is the 2023 sales by segment for north america?
</question>
```

What are the global sales by year?

512

| Year | Count of Sales |
|------|----------------|
| 2020 | 27500 |
| 2021 | 28000 |
| 2022 | 32000 |
| 2023 | 64000 |
| 2024 | 100000 |

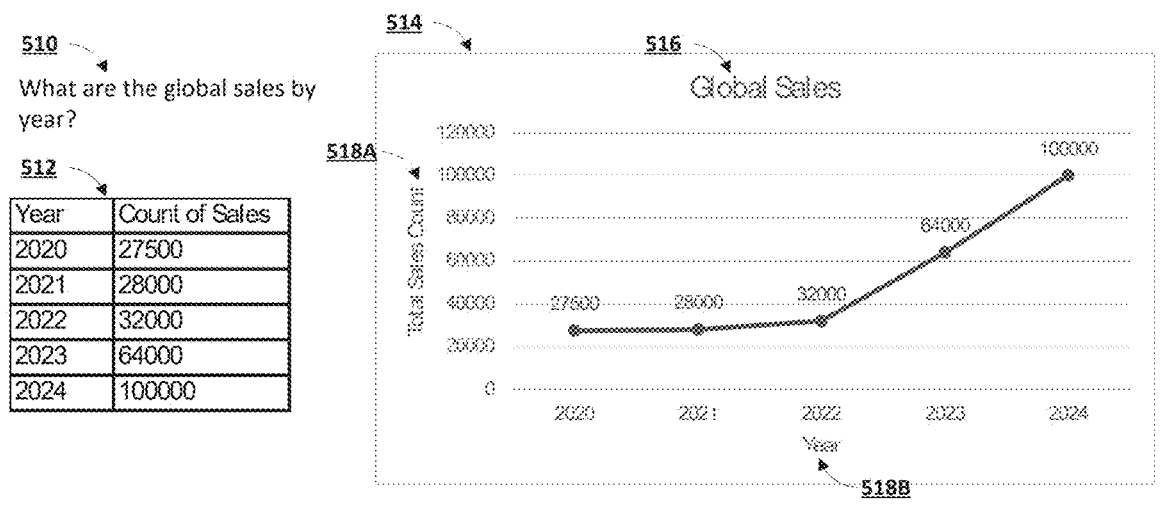

What are the 2024 sales by country for North America?

522

| Country | Sales Revenue |
|---------|---------------|
| United States | $1,600,000.00 |
| Canada | $950,000.00 |
| Mexico | $680,000.00 |

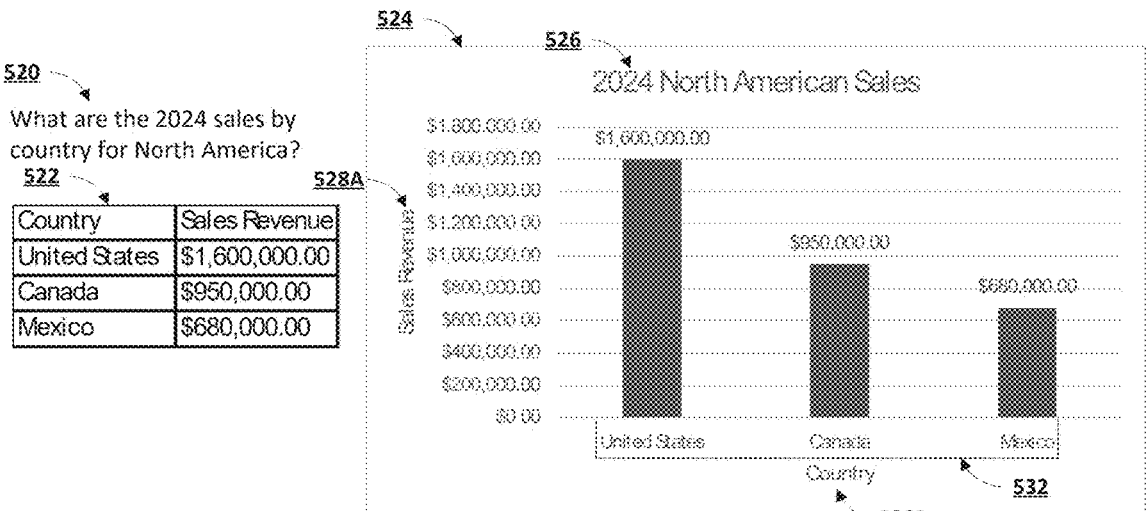

Show me a comparison of county enrollment across the state by school

532

| County | Enrollment |
|--------|-----------|
| County A | 84000 |
| County B | 75000 |
| County C | 110000 |
| County D | 15000 |
| County E | 26000 |

542

We could not find school specific enrollment data in the designated dataset. Please see a comparison of county enrollment across the state.

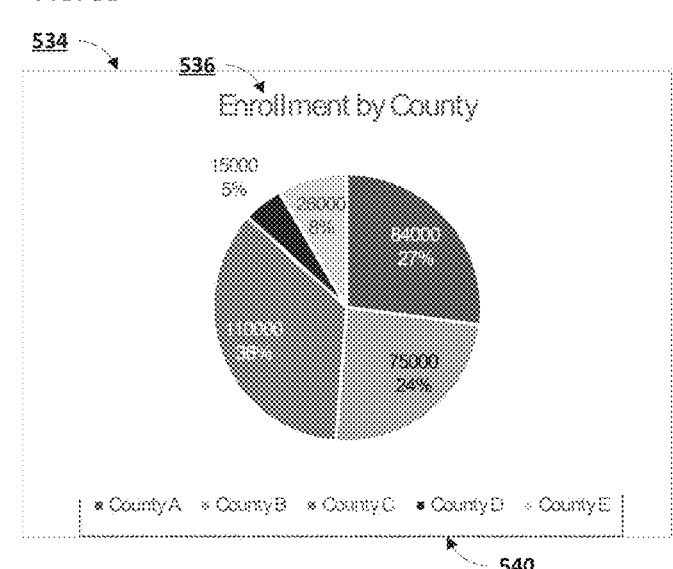

FIG. 5C

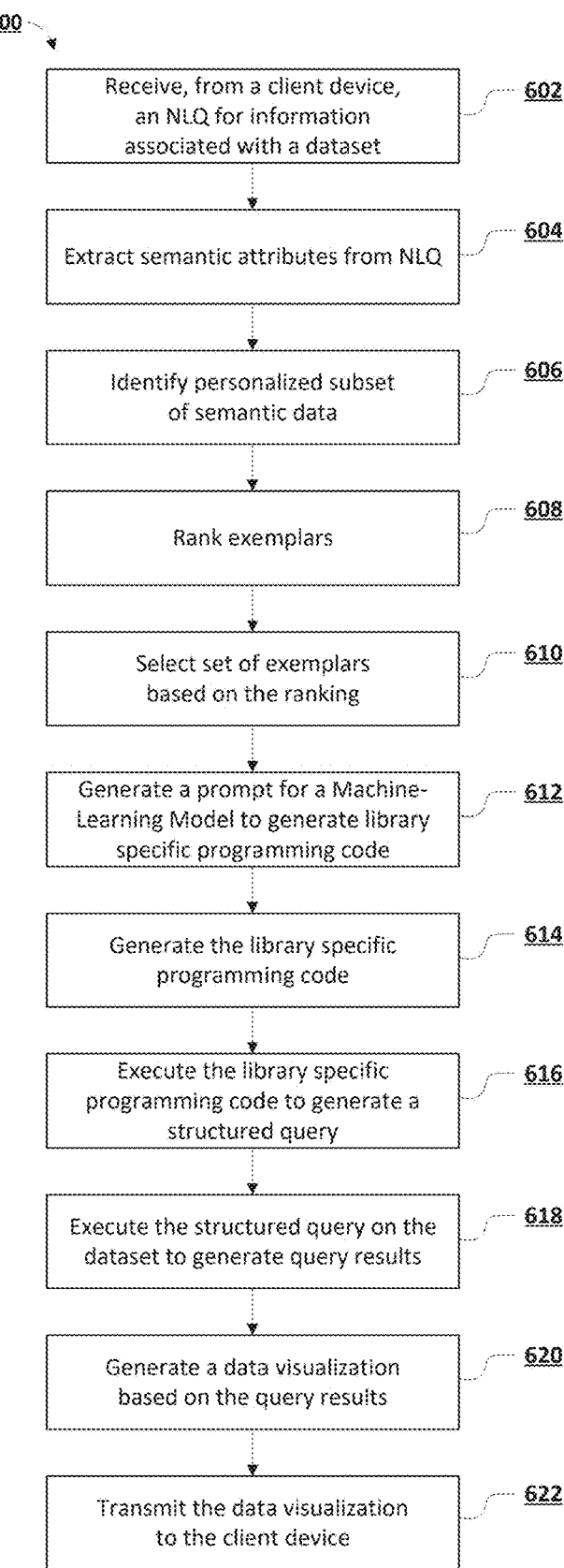

600

Receive, from a client device, an NLQ for information associated with a dataset — 602

Extract semantic attributes from NLQ — 604

Identify personalized subset of semantic data — 606

Rank exemplars — 608

Select set of exemplars based on the ranking — 610

Generate a prompt for a Machine-Learning Model to generate library specific programming code — 612

Generate the library specific programming code — 614

Execute the library specific programming code to generate a structured query — 616

Execute the structured query on the dataset to generate query results — 618

Generate a data visualization based on the query results — 620

Transmit the data visualization to the client device — 622

*FIG. 6*

GENERATE CUSTOMIZED DATA VISUALIZATION FROM NATURAL LANGUAGE QUERY

BACKGROUND

While operating an organization, the organization may generate and store data associated with their operations. The organization may wish to analyze their data to gather insights on their operations. Some systems can receive natural language queries about a dataset and return clearly identifiable results, such as information in a particular data cell. However, current systems fail to generate customized data visualization based on intent in ambiguous user queries.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 is an illustration of dynamic and static exemplars, according to some embodiments.

FIG. 4 is an illustration of a prompt to generate library specific programming code, according to some embodiments.

FIGS. 5A, 5B, and 5C are illustrations of data visualizations generated based on corresponding query results, according to some embodiments.

FIG. 6 illustrates an example routine for generating a data visualization in response to an NLQ, according to some embodiments.

DETAILED DESCRIPTION

Figure 1:
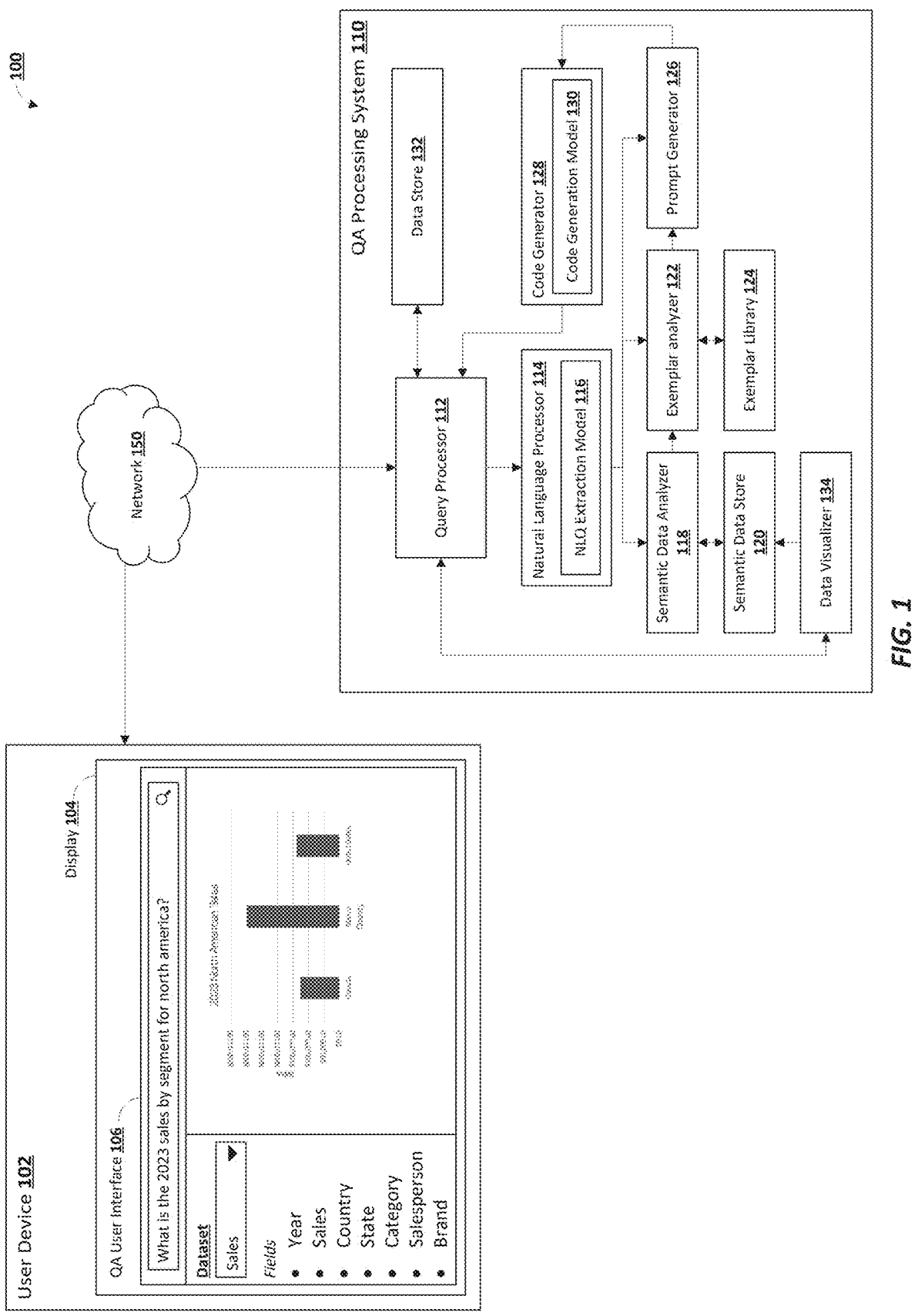
FIG. 1 is a block diagram illustrating an example computing environment, according to some embodiments.

Generally described, the present disclosure relates to using in-context learning to generate code for building a structured query of a dataset in response to a natural language query. More specifically, some aspects of the present disclosure relate to dynamic semantic-based selection of in-context learning exemplars to guide a machine learning model in generating code that targets a library encapsulating specific data access functionality.

Businesses or other entities often generate and store data during the course of operations. For example, the data may include information about their business such as sales or revenue figures. Or the data may include information about the technology used to run their business, such as system outages or security alerts. As another example, a school system may generate data about their students, such as assigned school, assigned classes, grades, attendance, etc. No matter the specifics, generally when a business or other entity generates a set of data, they may rely on the data to provide insights into their operations. For example, an online sales platform may want to compare sales figures over a period of time or detect when their network system experiences the highest customer loads. Current question-and-answer systems can allow users to ask natural language questions about a dataset and receive direct retrieval results. However, current systems require the natural language questions to include specific key data terms to be able to generate results and lack the ability to infer true meaning or intent in a query or question. For example, if a user asks for "sales for 2023," current systems would fail to generate results when the dataset doesn't contain a column for "sales" specifically, even if it includes a column for "revenue." Some systems address these problems using machine learning models trained to translate natural language queries into executable data access queries. However, such approach is highly prone to errors caused by hallucination, especially when dealing with large repositories of similar datasets or incomplete datasets.

Aspects of the present disclosure address the issues noted above by utilizing semantic attributes extracted from a natural language query (NLQ) to filter a set of programming code generation exemplars. A machine learning (ML) model such as a large language model (LLM) uses the exemplars to generate programming code that targets a library configured to generate a structured query. The structured query can then be executed against a dataset to return customized results with high accuracy.

In some embodiments, a question-and-answer (QA) processing system receives an NLQ, from a user device, requesting a data visualization based on data from a repository or dataset. An example NLQ may be "what were the sales for North America in December of last year?" and the dataset may include global sales figures for electronics over the last ten years. The dataset may include attributes for individual electronic sales including the date of the sale, the electronic sold, the brand of the electronic, the sale price, whether the sale was online or in person, the store where the electronic was sold, the shipping location for online sales, the salesperson, etc.

The QA processing system of the present disclosure can extract semantic attributes from the NLQ to help process the query. For example, given the above NLQ, "what were the sales for North America in December of last year?", the semantic attributes include the metric requested corresponding to "sales," a grouping (e.g., a "groupby" query command) corresponding to "North America," and a filter corresponding to "December of last year."

In some embodiments, the QA processing system uses the semantic attributes as search terms against a data store of semantic data associated with previously generated data visualizations, such as charts and tables. For example, when a data visualization is created, the QA processing system can add semantic data about the data visualization to the data store of semantic data. For a chart, the semantic data may include data such as the chart title, chart subtitle, axis titles, legend values, etc. For a table, the semantic data may include data such as table title, column or row identifiers, sheet name, etc.

The semantic data from the data visualizations can provide context for the NLQ. For example, if the NLQ is "last year's sales by quarter," the QA system may not be able to determine whether the user wants a number of individual sales per quarter or total sales revenue just using the semantic attributes of the NLQ. To gather more context, the QA system may search the data store of semantic data for the semantic attributes to gather data visualizations associated with the NLQ. For example, the search results may include a chart entitled "sales for 2023," showing monthly sales revenue. Based on this data, the QA system can infer that the user meant revenue rather than number of sales, and then generate results accordingly.

In some embodiments, the QA system uses the semantic attributes as well as the contextual data gathered from the data visualization semantic data search to filter a large set of exemplars. The QA system may store a large volume of exemplars of ML model inputs and outputs to use in a prompt to an ML model. The exemplars may contain a schema for a dataset, including column names and types, an NLQ, and programming code generated based on the schema and the NLQ. The system can use a ranking algorithm to generate a subset of exemplars (e.g., a list of the top 20 highest scoring exemplars, or more, or less) that best relate to the received NLQ. The ranking algorithm can account for the semantic attributes and contextual information, such as through word association.

The QA system can use the filtered list of exemplars to generate a prompt for an ML model (e.g., an LLM) to generate library specific programming code (LSP-Code). LSP-Code is programming code (e.g., code in the Python or Java languages) that targets a library or component configured to generate a structured query in a different language (e.g., in Structured Query Language (SQL) or another formatted query language such as MongoDB Query Language) that can be run on the dataset. In some embodiments, the library or component is a custom programming library that is new to the ML model, meaning that the ML model has not been trained on the custom programming library. For example, the training data upon which the ML model is trained does not include a specification of the custom programming library or examples of programming code targeting the custom library. To address the ML model's lack of training regarding the custom programming library, the prompt to the ML model to generate the LSP-Code can contain a specification of the custom programming library that the LSP-Code is to target, to enable proper generation of the code by the ML model. The specification can include detailed templates, variables, methods, and comments about the library inform the ML model about the functionality of the library, the function signatures to be used, and other aspects of interoperability with the library. Using LSP-Code enables greater adaptability to the needs of the QA system. For example, the dataset, or the database management system that manages the data set, may require queries to be submitted in a particular language or a particular format. Offloading the specifics of the data access language to a custom library of functions may simplify the task of code generation for the ML model, improving accuracy and efficiency of code generation. This further allows versatility as different libraries can be used for different datasets, and thus different specifications can be used during prompt generation. In addition, the library may include functionality to deal with irregularities from dealing with natural language input, even when the input is processed into programming code using exemplars as described herein. Offloading the specifics of handling some of such inconsistencies (e.g., missing column names, filter terms, or grouping terms) further simplifies the task of code generation for the ML model.

The prompt can include the library specification, the exemplars, a schema associated with the dataset for the received NLQ, the NLQ itself, and instructions to generate LSP-Code based on the specification, exemplars, schema, and NLQ. The QA system can then generate LSP-Code using the prompt and the ML model.

In some embodiments, the QA system executes the LSP-Code to generate a structured query, and then executes that query against the dataset associated with the received NLQ. In some embodiments, the QA system generates a simple response to the NLQ. For example, based on the query "what were the sales for North America in December of last year," the QA system may provide the simple summation of all sales revenue in North America for December of the previous year. In some embodiments, the QA system generates a data visualization based on the query results as a response to the NLQ. For example, based on the query "what were the sales for North America in December of last year," the QA system may generate a table, showing sales revenue of each country or sales region in North America for December of the previous year. In some embodiments, the QA system generates both a data visualization and a simple response. The QA system can provide the generated response to the user device as a response the received NLQ.

The embodiments disclosed herein enable more efficient computing resource utilization and management. Semantic analysis of the NLQ and previously generated data visualizations enables more efficient responses to commonly asked questions, reducing the amount of compute resources needed to analyze and respond to the NLQ. Further, the semantic analysis enables the system to gracefully handle scenarios where a user's question does not exactly match the dataset being queried. Further, the use of exemplars and a custom programming library specification vastly reduces the amount of compute resources that would otherwise be utilized to maintain a large fine-tuned ML model and a corresponding training set of millions of examples. Moreover, converting from NLQ to LSP-Code which can be used to generate a structured query, rather than converting directly from NLQ to the structured query enables greater control over the resulting structured query and allows for greater adaptability when accessing multiple databases.

Various aspects of the disclosure will be described with regard to certain examples and embodiments, which are intended to illustrate but not limit the disclosure. Although aspects of some embodiments described in the disclosure will focus, for the purpose of illustration on particular examples, the examples are illustrative only and are not intended to be limiting. Additionally, any feature used in any embodiment described herein may be used in any combination with any other feature or in any other embodiment, without limitation.

Example QA Processing System

With reference to an illustrative embodiment, FIG. 1 is a block diagram illustrating an example computing environment 100. In the illustrated example, the computing environment 100 includes user device 102, communication network 150, and QA processing system 110.

The user device 102 may include hardware and software components for establishing communications over a communication network 150. For example, the user device 102 may be equipped with networking equipment and network software applications (for example, a web browser) that facilitates communications via one or more networks (for example, the Internet or an intranet). The user device 102 may have varied local computing resources, such as, central processing units and architectures, memory, mass storage, graphics processing units, communication network availability and bandwidth, and so forth. Further, the user device 102 may include any type of computing system. For example, the user device 102 may be or include any type of computing device, such as desktops, laptops, and wireless mobile devices (for example, smart phones, PDAs, tablets, or the like), to name a few. The user device 102 includes a display 104. The display 104 displays the QA user interface 106. The QA user interface 106 includes various components, such as a dataset component containing a dataset selection and fields of the selected dataset, a dashboard section, with a visualization generated based on a NLQ, and a search bar to enable users to submit NLQs about the selected dataset. The network 150 can be a communications network such as a local area network, wide area network (e.g., the Internet), etc.

The QA processing system 110 includes a query processor 112, a natural language processor 114, a semantic data analyzer 118, a semantic data store 120, an exemplar analyzer 122, an exemplar library 124, a prompt generator 126, a code generator 128, a data store 132, and a data visualizer 134. In some embodiments, the QA processing system 110 includes more, less, or different components. In some embodiments, some components are combined. For example, the semantic data store 120 may be a component of the semantic data analyzer 118.

Figure 7:
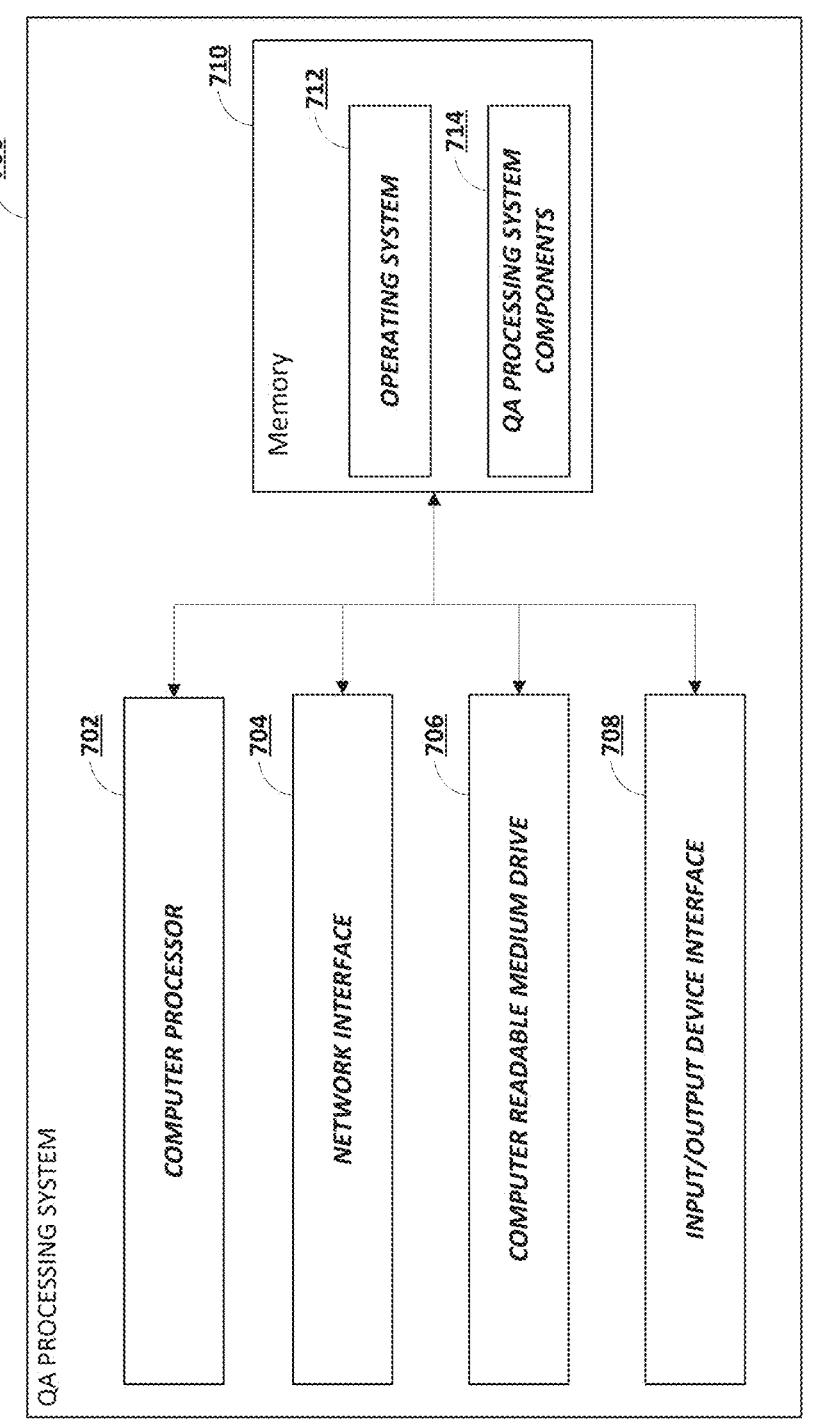
FIG. 7 is a block diagram of an illustrative computing system configured to generate unit tests, according to some embodiments.

The QA processing system 110 may be implemented on one or more physical server computing devices that provide NLQ processing and data visualization services to client device(s) 102. In some embodiments, the QA processing system 110 (or individual components thereof) are implemented on one or more host devices, such as blade servers, midrange computing devices, mainframe computers, desktop computers, or any other computing device configured to provide computing services and resources. For example, a single host device may execute one or more components of the QA processing system 110. The QA processing system 110 may include any number of such hosts. FIG. 7 illustrates an example computing device that may be used.

In some embodiments, the features and services provided by the QA processing system 110 are implemented as web services consumable via communication network 150. In further embodiments, the QA processing system 110 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The query processor 112 communicates with the user device 102 to receive NLQs and provide responses. In addition, the query processor 112 acts as a manager of the NLQ processing and data visualization generation process. The query processor 112 provides the NLQ to other components of the QA processing system 110 to generate LSP-Code. The query processor 112 executes the generated LSP-Code to generate a structured query. For example, the query processor 112 interfaces with the data store 132 to execute the structured query off a dataset stored in the data store 132. In some embodiments, the data store 132 stores multiple datasets for the same customer or multiple customers. Datasets for the different customers can be stored in different portions of the data store 132. Datasets may be associated with a dataset identifier to facilitate queries to the data store 132. The query processor 112 then executes the structured query to generate query results. The query processor 112 interfaces with the data visualizer 134 to provide the query results to the data visualizer 134 and receive a data visualization in response. The query processor 112 then transmits the response back to the user device 102. In some embodiments, the query processor 112 provides the structured query directly to the data visualizer 134 for execution and visualization creation.

The natural language processor 114 receives NLQs from the query processor 112 and extracts semantic attributes using the NLQ extraction model 116. The natural language processor 114 generates prompts for the NLQ extraction model 116. For example, the natural language processor 114 can generate a prompt including a NLQ received from the query processor 112 and request for semantic attributes of the NLQ. In some embodiments, the prompt includes example inputs and outputs to help the model generate expected results.

The NLQ extraction model 116 is an ML model. The NLQ extraction model 116 may be any type of ML model, such as a large language model. The NLQ extraction model 116 takes in a prompt from the natural language processor 114 and extract semantic attributes from an NLQ. In some embodiments, the NLQ extraction model 116 is trained on many examples (e.g., thousands or millions), or is given examples to work from in the prompt.

The semantic data analyzer 118 generates a personalized subset of semantic data (e.g., personalized to an NLQ) associated with one or more data visualizations based on the semantic attributes extracted by the NLQ extraction model 116. The semantic data analyzer 118 searches the semantic data store 120 for data visualization semantic data using the semantic attributes. The semantic data store 120 is a data store of semantic data about data visualizations. Data visualizations may be tables, charts, dashboards, or other visualizations, such as data flows, infographics, etc. The semantic data store 120 stores each data visualization along with semantic data about the data visualization. The data visualization and semantic data may be associated by a data visualization identifier, such as a numerical ID. Semantic data about a data visualization can include textual information in the data visualization. For example, semantic data about a chart may include the chart title, subtitle, axis titles, axis values, legend, and/or chart type (e.g., bar, column, line, scatter, pie). As another example, semantic data about a table may include a title of the table, column headers, row headers, column types (text, number, currency, date, etc.), and/or row types. As a further example, semantic data about a dataset used by a visualization may include an identifier of the dataset, column headers, row headers, column types (text, number, currency, date, etc.), and/or row types.

In some embodiments, the semantic data store 120 contains two indexes, a textual index and an embedding index. The textual index includes the plain text of the semantic data associated with a data visualization (e.g., chart tile, axis titles, legend values, etc.). The embedding index includes a sparse embedding of the semantic data associated with a data visualization. For example, each of the named entities or other textual components of the semantic data can be associated with a set of words that are semantically similar to the textual component and a weight for each. For example, a chart title may be "Global Sales." The embedding index may include an embedding for "Global" and an embedding for "Sales." For "Global," words such as "world," "country," "continent," or "north America" may be weighted as more semantically similar than words such as "round," "sphere," "large" given the context of the data visualization.

The semantic data store 120 may be populated by the data visualizer 134 during or after data visualization creation. For example, after data visualization creation, semantic data is provided to the semantic data store 120. In some embodiments, the semantic data is indexed into the textual index and the embedding index. In some embodiments, an ML Model is used to generate the embeddings for the semantic data.

Returning to the semantic data analyzer 118, as noted above, the 118 searches the semantic data store 120 using the semantic attributes. In some embodiments, the semantic data analyzer 118 searches the textual and embedding indexes. The search can return one or more data visualizations with semantic data matching one or more of the semantic attributes. The semantic data analyzer 118 creates inferences about the semantic attributes based on the data visualizations returned by the search. For example, an NLQ may say "show me all sales for the last year." Without additional context, there is ambiguity regarding whether the user wants aggregate sales revenue or a total number of sales for the last year. Further there is ambiguity regarding whether the user wants sales for the last calendar year or the last fiscal year. Based on the data visualizations returned by the search, the semantic data analyzer 118 may be able to make inferences about the semantic attributes to resolve these ambiguities. For example, if multiple charts are returned that all (or a majority of) include semantic embeddings for "sales" that correspond to "revenue", or close textual proximity between "sales" and "revenue" (e.g., common use of the term "sales revenue"), the semantic data analyzer 118 can infer that the user means revenue when using the term "sales" rather than a count of the number of individual sales. The semantic data analyzer 118 compiles inferences about the semantic attributes to generate the personalized subset of semantic data. The semantic data analyzer 118 passes the personalized subset of semantic data to the exemplar analyzer 122 to help aid with exemplar ranking and filtering.

The exemplar analyzer 122 populates a list of dynamic and static exemplars to facilitate LSP-Code generation. The exemplars may include examples of inputs to generate LSP-Code, and the expected LSP-Code based on the inputs. With reference to an illustrative embodiment, FIG. 3 illustrates example dynamic and static exemplars. Exemplars 304A and 304B are examples of dynamic exemplars and exemplar 304C is an example of a static exemplar. Dynamic exemplars 304A and 304B include a schema 306A and 306B respectively, an NLQ 308A and 308B respectively, and example LSP-Code 310A and 310B respectively. The example LSP-Code 310A and 310B are generated based on the corresponding schema (e.g., 306A or 306B) and NLQ (e.g., 308A or 308B). The schema for an exemplar is created based on a dataset associated with the NLQ.

For example, the exemplar 304A includes a schema section with the columns country, revenue, date, and continent. These are columns of a dataset associated with the NLQ 308A. The NLQ 308A is "What are the 2024 sales by country for North America?" In the example embodiment, the dataset associated with the NLQ 308A relates to the sale of items and includes data on each sale. When the natural language processor 114 extracts the semantic attributes for an NLQ, it can extract both the terms, and their associated category, such as whether the attribute corresponds to a metric, a grouping, a filter, a sort, etc. For the NLQ 308A the associated semantic attributes would be "sales" as a metric, "country" as a grouping, and "2024" and "North America" as filters. The exemplar analyzer 122 may select this exemplar from the exemplar library 124 based on the semantic attributes and the personalized subset of semantic data generated by the semantic data analyzer 118. For example, the schema 306A includes a column for "revenue", but not for "sales." However, the semantic data analyzer 118 may have detected during its search that the user typically means revenue when they say sales and that "revenue" is semantically similar to "sales." Accordingly, the exemplar analyzer 122 may select this exemplar to help teach a machine learning model that when the schema includes "revenue" and the NLQ includes "sales," the model should use "revenue" in place of "sales."

The exemplars 304A also includes example LSP-Code 310A. The LSP-Code 310A includes four function calls to a library (e.g., indicated by the "library." prefix to the respective function calls). The example functions generate components of a structured query, "add_metric," "add_groupby," "add_category_filter," and "add_date_range_filter." The "add_metric" function includes parameters for the column associated with the metric and an aggregation method, which is column 1 associated with revenue, and an aggregation method of summating the revenue. The "add_groupby" function includes a parameter for the column associated with the grouping, which is column 0 associated with country. The "add_category_filter" function is associated with a specific type of filter and includes parameters for the column associated with the filter and a function of how to filter based on the column, which is column 8 associated with continent, and a function for filtering on the rows with the exact value of "North America." And, the "add_date_range_filter" function is associated with a specific type of filter for date ranges and includes parameters for the column associated with the filter, and minimum and maximum values for the range, which is column 2 associated with date of sale, and the minimum and maximum values are the first and last dates of 2024. The exemplar 304B is another example of a dynamic exemplar including a schema 306B, NLQ 308B, and example LSP-Code 310B.

Dynamic exemplars are selected by the exemplar analyzer 122 from the exemplar library 124. The exemplar library 124 includes thousands of exemplars for the exemplar analyzer 122 to select from. The exemplar analyzer 122 selects a small subset of the exemplars from the exemplar library 124 to use in prompt generation. For example, the exemplar analyzer 122 may select the top 20 (or more or less) dynamic exemplars which best match the NLQ provided to the QA processing system 110. The exemplar analyzer 122 uses a ranking algorithm, such as the BM25 to identify the exemplars most semantically similar to the semantic attributes and/or the personalized subset of semantic data received from the semantic data analyzer 118.

The exemplar analyzer 122 also populates a list of static exemplars. Static exemplars are exemplars that include examples of how to handle a situation where a match for the semantic attributes, or the personalized subset of semantic data supplied by the semantic data analyzer 118, does not exist in the provided schema. For example, the exemplar 304C illustrates an example static exemplar that includes an unanswerability token for a missing grouping. The NLQ 308C requests "average scores by student name," but the schema does not include a column for student name. In response, the example LSP-Code 310C includes an unanswerability token of "<colx>" to indicate that the column parameter for the "add_groupby" function cannot be found in the provided schema. When executing the later generated LSP-Code, the QA processing system 110 with the library executing the "add_groupby" function interprets the unanswerability token as an unknown variable. Based on this, the QA processing system 110 may prompt a user of the user device 102 for more information to help answer the query, such as whether the user meant "student ID." In some cases, the QA processing system 110 may swap in a value for a semantically similar column, such as "student ID" and proceed to generate the structured query and eventual associated data visualization. In the response to the user device 102, the QA processing system 110 may include an explanation that "student ID" was used in place of "student name."

The prompt generator 126 generates prompts for the code generator 128. The prompt generator 126 generates prompts such as that illustrated in FIG. 4. With reference to an illustrative embodiment, FIG. 4 is an example prompt 400 for the code generator 128. The prompt 400 includes several sections including a task overview 402, a custom library specification 404, an instruction section 406, a dynamic exemplar section 408, a static exemplar section 410, and an input-and-output section 412.

The task overview 402 includes an overview of the task posed to the code generation model 130, to generate code using a custom library to respond to the provided NLQ. This will enable generating a visual plot for a customer question. In some embodiments, the task overview 402 includes different or additional details, such as to generate code in a specific programming language (e.g., Python). The custom library specification 404 (illustrated in the embodiment by a placeholder), includes a specification of a programming library for generating a structured query. In some embodiments, the programming library is custom built for processing by an ML model. In some embodiments, the programming library is a custom programming library that is new to the code generation model 130. For example, the training data upon which the code generation model 130 is trained does not include a specification of the custom programming library or examples of programming code targeting the custom library. In some embodiments, the custom library specification 404 includes the methods available in the library as well as the method parameters, along with explanations about the functionality of each. For example, the library specification may include a metrics section such as:

To create a metric node, we can use the following method within the library:

```
def add_metric(operand_id, aggregation)
"""
Parameters:
"operand_id": column ID from schema
"aggregation": function, such as SUM|MIN|MAX-
    |COUNT
"""
```

The instruction section 406 includes requirements for the code generation model 130 to follow. For example, requirements may include, "only generate code within designated <code ></code> tags," "do not import new libraries," "operand_id parameter should strictly be a column from the schema following <colx> notation," and/or it can provide the current time. The dynamic exemplar section 408 includes the dynamic exemplars received from the exemplar analyzer 122, such as the exemplars 304A and the exemplars 304B. The static exemplar section 410 includes the static exemplars received from the exemplar analyzer 122 such as the exemplar 304C. The input-and-output section 412 includes inputs to use to generate an output of LSP-Code. The inputs include a schema and an NLQ received from the user device 102. The output component can include "<code></code>" tags directing the code generation model 130 where to put the generated code. In some embodiments, the prompt includes more, less, or different sections. For example, the instructions and task overview sections may be combined.

The code generator 128 takes in a prompt from the prompt generator 126, provide the prompt to the code generation model 130, and receive generated LSP-Code from the code generation model 130. The code generation model 130 is an ML model. The code generation model 130 can be any type of ML model, such as an LLM, that can take in a prompt and generate output. The code generation model 130 generates LSP-Code based on a prompt including a task overview, library specification, dynamic and static exemplars, schema, and NLQ. The code generator 128 provides the LSP-Code generated by the code generation model 130 to the query processor 112 for further processing.

As described above, the query processor 112 executes the LSP-Code to generate a structured query and executes the structured query to generate query results. The query processor 112 then provides the query results to the data visualizer 134 to generate a corresponding customized data visualization based on the query results. For example, the data visualizer 134 can generate customized data visualizations, such as those illustrated in FIGS. 5A-5C.

With reference to illustrative embodiments, FIGS. 5A-5C depict data visualization generated based on corresponding query results. FIG. 5A depicts a line chart 514 generated based on the query results 512. The query results 512 were generated in response to the NLQ 510, "What are the global sales by year?" The query results 512 include a table with columns for year and count of sales. Additionally, the data visualization 514 includes semantic data such as the chart title 516 ("Global Sales"), the vertical axis title 518A ("Total Sales Count"), and the horizontal axis title 518B ("Year").

FIG. 5B depicts a column chart 524 generated based on the query results 522. The query results 522 were generated in response to the NLQ 520, "What are the 2024 sales by country for North America?" The query results 522 include a table with columns for country and sales revenue and values including North American countries and their revenue for 2024. Additionally, the 524 includes semantic data such as the chart title 526 ("2024 North American Sales"), the vertical axis title 528A ("Sales revenue"), the horizontal axis title ("Country"), and the horizontal axis values ("United States," "Canada," and "Mexico").

FIG. 5C depicts a pie chart 534 generated based on the query results 532. The query results 532 were generated in response to the NLQ 530, "Show me a comparison of county enrollment across the state by school." The query results 532 include a table with columns for county and enrollment. Although the NLQ requested a comparison of county enrollment across the state by school, FIG. 5C depicts a scenario where the corresponding dataset did not include the requested data. Accordingly, as a fallback measure, the QA processing system 110 generated data based on the information that was included in the dataset. In addition, the QA processing system 110 generated the response message 542 to explain to a user that not all requested data could be found. Further, although not specifically requested in the NLQ, the data visualization 534 depicts both enrollment as a numerical figure and as a percentage since the NLQ requested comparison across the state. Thus, based on the semantic attributes of the NLQ, the QA processing system 110 may have inferred that the user wants to see the enrollment of each county as a percentage of total state enrollment. Additionally, the data visualization 534 includes semantic data such as the chart title 536 ("Enrollment by County"), and legend values 540 ("County A", "County B," "County C," "County D," and "County E").

Although specific chart types are depicted, the data visualizer 134 can generate a variety of data visualizations, including other types of charts, dashboards, dataflows, infographics, etc. Further, the data visualizer 134 can add the semantic data about generated data visualizations to the semantic data store 120 to facilitate inferences for future queries.

Example Data Visualization Generation Process

Figure 2:
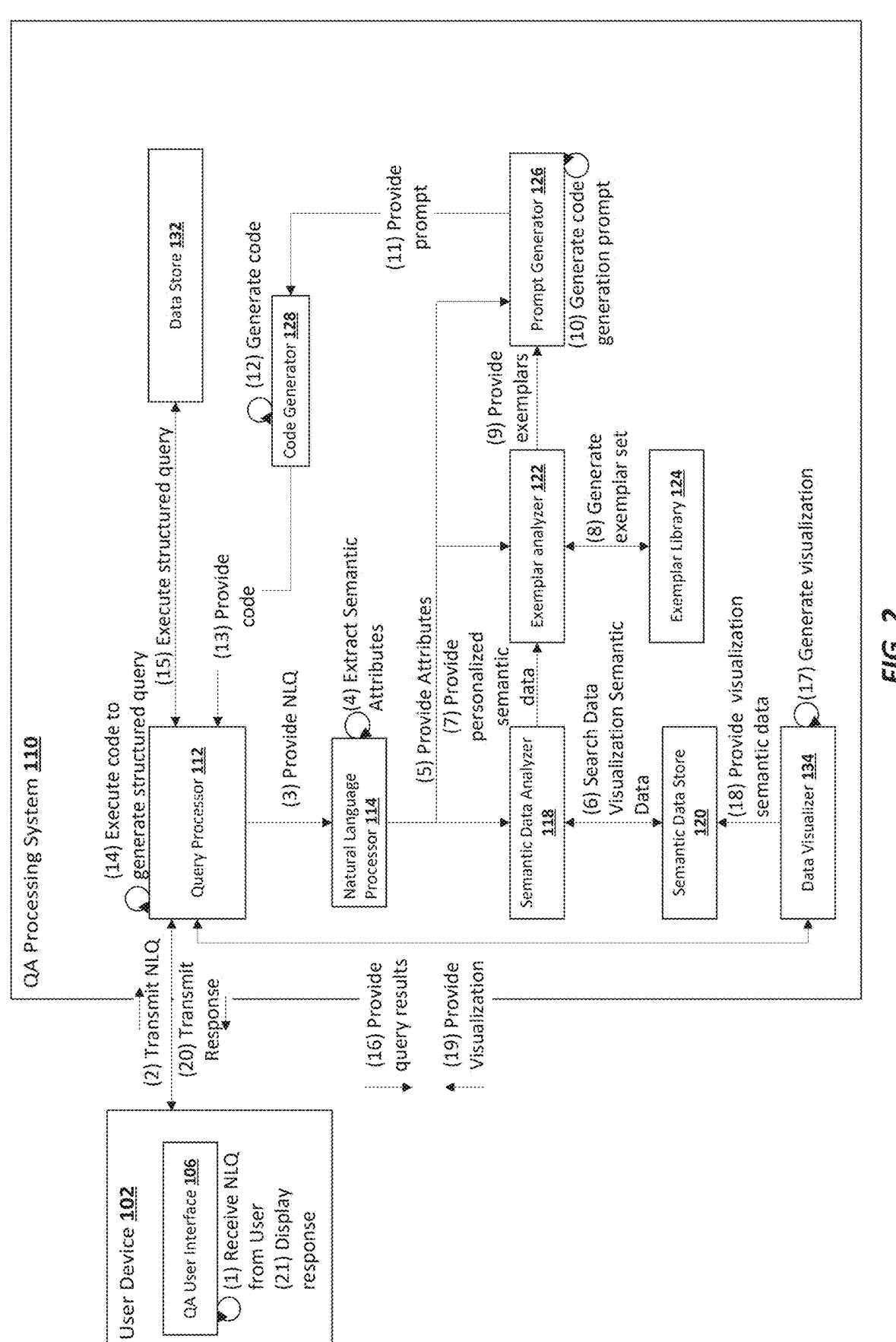
FIG. 2 is a diagram showing data flows and interactions between a user device and components of a QA processing system to generate a data visualization based on a natural language query (NLQ), according to some embodiments.

With reference to an illustrative embodiment, FIG. 2 shows example data flows and interactions between a user device 102 and components of a QA processing system 110 to generate a data visualization based on an NLQ. Although illustrated with specific components, components may be combined, or different components may be used to perform the steps.

At step (1), the user device 102 receives an NLQ, such as "Show me 2024 sales by country for Europe," from a user via the QA user interface 106. For example, the user may enter the query in a search bar on the QA user interface 106. Additionally, the QA user interface 106 can display a corresponding dataset.

At step (2), the user device 102 transmits the NLQ to the QA processing system 110. The QA processing system 110 receives the NLQ via the query processor 112. For example, the QA processing system 110 may include an API endpoint associated with the query processor 112. In some embodiments, the user device 102 transmits the NLQ as part of a data request to the API endpoint. In some embodiments, the data request includes a dataset identifier corresponding to the dataset associated with the NLQ. The dataset identifier can correspond to a dataset stored in the data store 132.

At step (3), the query processor 112 provides the NLQ to the natural language processor 114. In some embodiments, the query processor 112 provides a package containing the NLQ and the associated dataset to enable greater semantic context of the NLQ.

At step (4), the natural language processor 114 extracts semantic attributes from the NLQ. In some embodiments, the 114 generates a prompt for an NLQ extraction model 116 to extract the semantic attributes. For example, the prompt can include a task description, such as "please extract all semantic attributes from the provided NLQ." In addition, the prompt includes examples of other NLQs and associated extracted semantic attributes. The natural language processor 114 provides the prompt to the NLQ extraction model 116. The NLQ extraction model 116, based on the prompt, returns extracted semantic data for an NLQ. For example, given the NLQ, "Show me 2024 sales by country for Europe," the NLQ extraction model 116 can output an object comprising the semantic attributes and potential query associations:

```
semantic_attributes {
    metric: "sales",
    grouping: "county",
    category_filter: "Europe",
    data_range_filter: "2024"
}
```

At step (5), the natural language processor 114 provides the extracted semantic attributes to the semantic data analyzer 118, the exemplar analyzer 122, and the prompt generator 126. In some embodiments, the query processor 112 provides a package containing the NLQ, the extracted semantic attributes, and the associated dataset to enable greater semantic context of the NLQ.

At step (6), the semantic data analyzer 118 searches the semantic data store 120 using the semantic attributes. The semantic data analyzer 118 may perform the search in two stages. A first stage may involve searching the textual index for exact matches of the semantic attributes. For example, given semantic attributes of "sales," "country," "Europe," and "2024," the semantic data analyzer 118 can search to see if any data visualizations in the semantic data store 120 include the same semantic attributes. Such a search may generate results such as a chart of 2024 global sales by region, where the title is "2024 Global Sales," the horizontal axis title is "Region," and the horizontal axis values include "Europe." A second stage may involve searching the embedding index for semantically similar terms to the semantic attributes. For example, "sales" could be related to "revenue" and "2024" could be related to "year." This search may generate results such as a chart with the title "Global Revenue" and a horizontal axis title of "year."

Based on the results of the search, the semantic data analyzer 118 may be able to generate context about the NLQ. For example, based on the NLQ "Show me 2024 sales by country for Europe," the semantic data analyzer 118 may find data visualizations such as the data visualization 514 and the data visualization 524 of FIGS. 5A and 5B. The semantic data analyzer 118 may analyze the semantic data from each data visualization including title, axis titles, and axis values to determine which has greater semantic similarity to the semantic attributes. The analysis may include a determination of whether the exact attribute terms or semantically similar attribute terms are included in the data visualization and whether the attribute categories (e.g., metric, grouping, sort, filter, etc.) match. For example, for a column chart, if a term appears in a chart title it can be inferred to be a filter, if a term appears on a vertical axis, it can be inferred to be a metric, and if a term appears in a horizontal axis, it can be inferred to be a grouping.

When comparing the semantic attributes of the NLQ ("sales" as a metric, "country" as a grouping, and "Europe" and "2024" as filters) with the semantic data of the data visualization 524, the semantic data analyzer 118 can determine that three out of the four semantic attribute terms have exact matches with the semantic data of the data visualization 524, "2024" and "sales" appear in the title, "sales" appears in the vertical axis title, and "country" appears in the horizontal axis title. Further, the semantic data analyzer 118 can determine that the semantic categories match as well. The semantic data analyzer 118 can infer that "2024" appearing in the chart title of the data visualization 524 means that "2024" is a filter; the semantic data analyzer 118 can infer that "country" appearing in the horizontal axis title of the data visualization 524 means that "country" is a grouping; and the semantic data analyzer 118 can infer that "sales" appearing in the vertical axis title of the data visualization 524 means that "sales" is a metric. Thus, the attribute categories of the semantic attributes match the attribute categories of the semantic data from the 524.

In contrast, when comparing the semantic attributes of the NLQ with the semantic data of the data visualization 514, the semantic data analyzer 118 can determine that two out of the four semantic attribute terms have an exact match ("sales" and "2024") and two have a semantic match ("country" and "Europe" to "global) with the semantic data of the data visualization 514. Further, when comparing the attribute categories, the semantic data analyzer 118 an determine that only one of the attributes have a category match. The semantic data analyzer 118 can infer that "Global" appearing in the chart title of the data visualization 514 means that "Global" is a filter; the semantic data analyzer 118 can infer that "2024" appearing in the horizontal axis values of the data visualization 514 means that "2024" is a grouping; and the semantic data analyzer 118 can infer that "sales" appearing in the vertical axis title of the data visualization 514 means that it "sales" a metric. As compared to the categories of the NLQ, only the "sales" attribute matches.

Based on the term and category analysis, the semantic data analyzer 118 may determine that the data visualization 524 is a closer match than the data visualization 514 as more semantic attributes of the NLQ have exact term matches and category matches to the semantic data of the data visualization 524 than to the semantic data of the data visualization 514. Further, based on the determination that the data visualization 524 is more on point than the data visualization 514, the semantic data analyzer 118 can infer that the user who submitted the NLQ likely wants to see sales revenue, as represented in the data visualization 524, rather than a count of sales, as represented in the data visualization 514. The semantic data analyzer 118 augments the semantic attributes with this inferred information. For example, the semantic data analyzer 118 may generate a semantic data object such as: semantic data {metric: "revenue", metric_aggregation: sum} to indicate that sales can be equated to revenue and that sales values should be summated rather than individual sales counted.

In some embodiments, the semantic data analyzer 118 prioritizes data visualization based on the time period in which they were created or last viewed. For example, the semantic data analyzer 118 may prioritize data visualization created in the last week (or a shorter or a longer period). As another example, the semantic data analyzer 118 may prioritize data visualization that were last viewed by the user who submitted the NLQ within the last 3 days (or a shorter or longer period)

At step (7), the semantic data analyzer 118 provides the semantic data to the 122 to help enable the generation of a set of exemplars. In some embodiments, during the search of the semantic data store 120, the semantic data analyzer 118 finds a data visualization that exactly matches the NLQ, such as if the NLQ has been asked before. In such cases, the semantic data analyzer 118 may communicate the identifier of the data visualization back to the query processor 112 so that it can request the customized data visualization from the data visualizer 134 and return the result to the user device 102. This enables more efficient query processing for repetitive queries.

At step (8), the exemplar analyzer 122 generates a set of exemplars. The set of exemplars includes both dynamic exemplars and static exemplars. The exemplar analyzer 122 generates the set of dynamic exemplars using the semantic attributes and the semantic data received from the semantic data analyzer 118. The exemplar analyzer 122 ranks the exemplars in the exemplar library 124 based on semantic similarity to the semantic attributes and the semantic data. For example, using the BM25 ranking function, the exemplar analyzer 122 ranks exemplars based on whether and how often the semantic attributes appear in a particular exemplar. Further, the exemplar analyzer 122 may use semantically similar terms included in the semantic data received from the semantic data analyzer 118, such as "revenue" in addition to "sales." Based on the ranking function, the exemplar analyzer 122 identifies the top 20 (or more or less) exemplars that best match the NLQ. In some embodiments, the exemplar analyzer 122 attempts to introduce some entropy into the exemplar selection process. For example, the exemplar analyzer 122 may identify the top 60 (or more or less) exemplars and randomly select a portion (e.g., 20 or more or less) of the top exemplars. As another example, the exemplar analyzer 122 may identify the top 60 exemplars and randomly choose a portion (e.g., 10, or more or less) of the top 20 (or more or less) exemplars and a portion (e.g., 10, or more or less) of the top 21-60 exemplars.

As described above with reference to FIG. 1, the static exemplars may be predefined examples illustrating how the code generation model 130 should handle scenarios where an NLQ cannot be answered based on the dataset provided, such as where no columns match one of the semantic attributes. The static exemplars may be stored in exemplar library 124 and retrieved by the exemplar analyzer 122 when generating the set of exemplars. In some embodiments, the static exemplars are stored separately from the dynamic exemplars, such as in different portions of the same data store or in different data stores.

At step (9), the exemplar analyzer 122 provides the exemplars to the prompt generator 126 to enable prompt generation.

At step (10), the prompt generator 126 generates a prompt for the code generation model 130 to generate LSP-Code. The prompt generator 126 uses the NLQ, the dataset, and the exemplars to generate the prompt. As described above, the prompt includes a task overview, a library specification, specific instructions for code generation, the dynamic exemplars, the static exemplars, inputs, and an output section. The inputs include a schema based on the dataset and the NLQ. The output section is the location for the code generation model 130 to put the generated code. In some embodiments, the library specification is stored in a datastore, such as the data store 132 and retrieved by the prompt generator 126 at time of prompt generation.

In some embodiments, the prompt generator 126 generates a schema from the dataset. The schema includes some or all of the columns from the dataset. In some cases, some of the columns of the dataset are not relevant to the NLQ. For example, the dataset may be associated with electronic sales and include the following columns: date, item_id, brand, revenue, country, continent, and salesperson. Given the NLQ, "show me 2024 sales by country for Europe," the columns for item_id, salesman, and brand, may be excluded from the schema as they are not relevant for answering the query.

At step (11), the prompt generator 126 provides the prompt to the code generator 128. At step (12), the code generator 128 generates the LSP-Code. The code generator 128 provides the prompt to the code generation model 130. The code generation model 130 then generates LSP-Code based on the prompt. At step (13), the code generator 128 provides the generated LSP-Code to the query processor 112 for further processing.

At step (14), the query processor 112 executes the LSP-Code to generate a structured query for the dataset. In some cases, the query processor 112 simply executes the LSP-Code as is to generate a query. In some cases, the query processor 112 identifies that the code includes an unanswerability token. In such cases, the query processor 112 may generate a response for the user device 102 requesting clarity. For example, if the NLQ was modified to "show me 2024 sales by segment for Europe," the query processor 112 may generate a message stating that "the requested data does not include a 'segment' category, did you mean 'country'?" The query processor 112 may provide the message to the user device 102. Based on a clarifying response from the user, such as an affirmative "yes," or an alternative such as "no, salesperson," the query processor 112 can update the unanswerability token with the correct column identifier and proceed with executing the code.

In some embodiments, the query processor 112 attempts to resolve the unanswerability token by identifying a semantically similar column in the dataset to the column associated with the unanswerability token. For example, the exemplar 304C illustrates a scenario in which the schema does not include a column for a component of the NLQ, specifically, the schema 306C does not include "student name." However, the schema does include a column for "student id." The query processor 112 may identify that "student id" is semantically similar to "student name" in that each can act an identifier for a student. Accordingly, the query processor 112 may update the unanswerability token <colx> with <coll> and continue with executing the code. In some embodiments, the query processor 112 identifies the semantically similar column, and modifies the NLQ itself. For example, the query processor 112 may update the NLQ 308C from "average scores by student name" to "average scores by student id." The routine may then restart from step (3), with the query processor 112 providing the updated NLQ to the natural language processor 114.

In some embodiments, the query processor 112 identifies an error with the LSP-Code and generates an error message. The routine may then restart at (3) with the query processor 112 providing the NLQ to the natural language processor 114 in addition to the error message, which may eventually be passed to the prompt generator 126. The prompt generator 126 generates a prompt similar to that generated at (10), but additionally instructing the code generation model 130 to correct the LSP-Code based on the error message. Based on the prompt from the prompt generator 126, the code generation model 130 attempts to correct the error identified by the query processor 112 during a second attempt at generating the LSP-Code to answer the NLQ.

At step (15), the query processor 112 executes the structured query generated at (14) to generate query results. The query processor 112 executes the structured query against the dataset stored in the data store 132. The query results may be a table, such as the results 512, the results 522, or results 532.

At step (16), the query processor 112 provides the query results to the data visualizer 134 to generate a customized data visualization, such as the data visualization 514, the data visualization 524, or the data visualization 534. In some embodiments, the query processor 112 provides the query results as part of a package including a request for a specific type of data visualization.

At step (17), the data visualizer 134 generates a customized data visualization using the query results. In some embodiments, where the query results are provided as part of a packing including a request for a specific type of data visualization, the data visualizer 134 generates the data visualization based on the request. For example, if the request is for a column chart, the data visualizer 134 generates a column chart.

In some embodiments, the data visualizer 134 analyzes the results to determine the best type of visualization to generate. For example, the data visualizer 134 may determine that data categorized by time, may be best visualized with a line chart, such as the data visualization 514. As another example, the data visualizer 134 may determine that data categorized by county may be best visualized by a pie chart showing the amount and percentage of each county as compared to the state as a whole, such as in the data visualization 534.

At step (18), the data visualizer 134 provides the semantic data about the newly generated data visualization to the semantic data store 120. In this way, the semantic data associated with the newly generated data visualization is available for processing subsequent NLQs. The semantic data can be associated via a data visualization identifier, such as a numerical id.

At step (19), the data visualizer 134 provides the customized data visualization to the query processor 112. At step (20), the query processor 112 transmits a response to the user device 102. In some embodiments, the response includes the visualization and the raw query results. In some embodiments, the response just includes the visualization. At step (21), the user device 102 receives the response from the query processor 112 and displays the response to the user via the QA user interface 106.

Example Data Visualization Generation Routine

With reference to an illustrative embodiment, FIG. 6 illustrates an example routine 600 for generating a data visualization in response to an NLQ. The routine 600 begins at block 602. The routine 600 may begin in response to an event, such as receipt by a QA processing system of an NLQ. When the routine 600 is initiated, a set of executable program instructions stored on one or more non-transitory computer-readable media (e.g., hard drive, flash memory, removeable media, etc.) may be loaded into memory (e.g., random access memory or RAM) of a QA processing system, such as the QA processing system 700 shown in FIG. 7, and executed by one or more processors. In some embodiments, the routine 600 or portions thereof are implemented on multiple processors, serially, or in parallel.

At block 602, the query processor 112 receives from a client device, such as the user device 102, an NLQ for information associated with a dataset. In some embodiments, the query processor 112 performs operations as described herein with reference to steps (2) and (3) of FIG. 2. For example, the query processor 112 receives the NLQ, and then passes the NLQ to the natural language processor 114 for semantic attribute extraction.

At block 604, the natural language processor 114 extracts semantic attributes from the NLQ. In some embodiments, the natural language processor 114 performs operations as described herein with reference to steps (4) and (5) of FIG. 2. For example, the natural language processor 114 extracts semantic attributes from the NLQ and provide the semantic attributes to the semantic data analyzer 118.

At block 606, the semantic data analyzer 118 identifies a personalized subset of semantic data. In some embodiments, the semantic data analyzer 118 performs operations as described herein with reference to steps (6) and (7) of FIG. 2. For example, the semantic data analyzer 118 searches a set of semantic data stored in the semantic data store 120 for the semantic attributes and generates a set of semantic data based on the results. The semantic data analyzer 118 then provides the semantic data to the exemplar analyzer 122.

At block 608, the exemplar analyzer 122 ranks exemplars. In some embodiments, the exemplar analyzer 122 performs operations as described herein with reference to step (8) of FIG. 2. For example, the exemplar analyzer 122 applies a ranking function, such as BM25, against the exemplars in the exemplar library 124 using the semantic attributes and the personalized subset of semantic data.

At block 610, the exemplar analyzer 122 selects a set of exemplars based on the ranking. In some embodiments, the exemplar analyzer 122 performs operations as described herein with reference to steps (8) and (9) of FIG. 2. For example, based on the ranking, the exemplar analyzer 122 selects the top 20 (or more or less) exemplars that best match the semantic attributes and the personalized subset of semantic data. Further the exemplar analyzer 122 selects a set of static exemplars. The exemplar analyzer 122 then provides the exemplars to the prompt generator 126 for prompt generation.

At block 612, the prompt generator 126 generates a prompt for an ML model to generate library specific programming code. In some embodiments, the prompt generator 126 performs operations as described herein with reference to steps (10) and (11) of FIG. 2. For example, the prompt generator 126 generates a prompt including a task overview, a library specification, instructions, the set of exemplars, a schema, and the NLQ. The prompt generator 126 provides the prompt to the code generator 128 for LSP-Code generation.

At block 614, the code generator 128 generates the LSP-Code. In some embodiments, the code generator 128 performs operations as described herein with reference to steps (12) and (13) of FIG. 2. For example, the code generator 128 provides the prompt received from the prompt generator 126 to the code generation model 130, which generates LSP-Code using the prompt. The code generator 128 then provides the generated LSP-Code to the query processor 112.

At block 616, the query processor 112 executes the library specific programming code to generate a structured query. In some embodiments, the query processor 112 performs operations as described herein with reference to step (14) of FIG. 2.

At block 618, the query processor 112 executes the structured query on the dataset to generate query results. In some embodiments, the query processor 112 performs operations as described herein with reference to steps (15) and (16) of FIG. 2. For example, the query processor 112 executes the structured query results and then provide the query results to the data visualizer 134 to generate a customized data visualization.

At block 620, the data visualizer 134 generates a customized data visualization based on the query results. In some embodiments, the data visualizer 134 performs operations as described herein with reference to steps (17), (18) and (19) of FIG. 2. For example, the data visualizer 134 generates a data visualization based on the query results, add the semantic data associated with the data visualization to the semantic data store 120, and provide the data visualization back to the query processor 112.

At block 622, the query processor 112 transmits the data visualization to the client device. In some embodiments, the query processor 112 performs operations as described herein with reference to step (20) of FIG. 2.

Execution Environment

FIG. 7 illustrates various components of an example QA processing system 700 configured to implement various functionality described herein.

In some embodiments, the QA processing system 700 is implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the QA processing system 700 are implemented as web services consumable via one or more communication networks. In further embodiments, the QA processing system 700 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment In some embodiments, as shown, an QA processing system 700 includes: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SSDs"), flash drives, and/or other persistent non-transitory computer readable media; one or more input/output device interfaces; and one or more computer-readable memories 710, such as random access memory ("RAM") and/or other volatile non-transitory computer readable media.

The computer-readable memory 710 may include computer program instructions that one or more computer processors 702 execute and/or data that the one or more computer processors 702 use in order to implement one or more embodiments. For example, the computer-readable memory 710 can store an operating system 712 to provide general administration of the 700. As another example, the computer readable memory 710 can store QA processing system components 714 for processing NLQs.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system is a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   identifying a subset of exemplars of a plurality of exemplars based on first semantic data associated with a natural language query and second semantic data associated with one or more data visualizations, each exemplar in the subset of exemplars comprising a respective example input and a corresponding example output;
   generating library specific programming code using a prompt and a machine learning model, the prompt comprising instructions to generate the library specific programming code based on at least: a specification of a library associated with the library specific programming code and the subset of exemplars, wherein the library is new to the machine learning model; and
   executing, using the library, the library specific programming code to generate a structured query configured to produce a result for the natural language query that includes a customized data visualization.

2. The computer-implemented method of claim 1, further comprising:
   executing the structured query to generate query results;
   generating a customized data visualization based on the query results; and transmitting the customized data visualization to a client device in response to the natural language query.

3. The computer-implemented method of claim 2, further comprising adding semantic data associated with the customized data visualization to a dataset of semantic data.

4. The computer-implemented method of claim 1, further comprising:

receiving, from a client device, the natural language query for information associated with a first dataset;

extracting the first semantic data from the natural language query; and identifying the second semantic data from the one or more data visualizations.

5. The computer-implemented method of claim 4, wherein the machine learning model is a first machine learning model, wherein the prompt is a first prompt, and wherein extracting the first semantic data from the natural language query further comprises using a second prompt and a second machine learning model.

6. The computer-implemented method of claim 4, wherein extracting the first semantic data from the natural language query comprises identifying named entities of the natural language query corresponding to at least one of metrics, filters, or query commands.

7. The computer-implemented method of claim 4, wherein identifying the second semantic data comprises prioritizing data visualizations of the one or more data visualizations based on whether the data visualizations were provided to the client device within a predetermined time period.

8. The computer-implemented method of claim 1, wherein the subset of exemplars is a first subset of exemplars, and wherein the computer-implemented method further comprises identifying a second subset of exemplars, each exemplar in the second subset of exemplars comprising:

an example natural language query, an example schema, the example schema missing a column associated with at least one semantic attribute, and an example of library specific programing code, the library specific programming code including an unanswerability token.

9. The computer-implemented method of claim 1, further comprising:

identifying an error in the library specific programming code;

generating an error message based on the error; and generating updated library specific programming code using a second prompt and the machine learning model, the second prompt comprising instructions to generate the updated library specific programming code based on: the specification of the library associated with the library specific programming code, the subset of exemplars, the natural language query, and the error message.

10. The computer-implemented method of claim 1, further comprising ranking individual exemplars of the plurality of exemplars based on proximity to the first and second semantic data to generate a rank value for individual exemplars, and selecting a subset of exemplars based on the rank value of individual exemplars.

11. The computer-implemented method of claim 10, wherein selecting the subset of exemplars comprises selecting individual exemplars having the rank value above a predetermined threshold.

12. A system comprising computer readable memory and one or more processors, wherein the system is configured to:

identify a subset of exemplars of a plurality of exemplars based on first semantic data associated with a natural language query and second semantic data associated with one or more data visualizations, each exemplar in the subset of exemplars comprising a respective example input and a corresponding example output;

generate library specific programming code using a prompt and a machine learning model, the prompt comprising instructions to generate the library specific programming code based on at least: a specification of a library associated with the library specific programming code, and the subset of exemplars, wherein the library is new to the machine learning model; and execute, using the library, the library specific programming code to generate a structured query configured to produce a result for the natural language query that includes a customized data visualization.

13. The system of claim 12, wherein an example input comprises a schema and an example natural language query, and wherein a corresponding example output comprises an example of library specific programming code.

14. The system of claim 12, wherein the system is further configured to:

execute the structured query to generate query results;

generate a customized data visualization based on the query results; and transmit the customized data visualization to a client device in response to the natural language query.

15. The system of claim 14, wherein the system is further configured to add semantic data associated with the customized data visualization to a dataset of semantic data.

16. The system of claim 12, wherein the system is further configured to:

receive, from a client device, the natural language query for information associated with a first dataset;

extract the first semantic data associated from the natural language query; and identify the second semantic data from the one or more data visualizations.

17. The system of claim 16, wherein to extract the first semantic data from the natural language query, the system is further configured to identify named entities in the natural language query corresponding to at least one of metrics, filters, or query commands.

18. The system of claim 12, wherein the machine learning model is a large language model.

19. The system of claim 12, further configured to rank individual exemplars of the plurality of exemplars based on proximity to the first and second semantic data to generate a rank value for individual exemplars, and to select a subset of exemplars based on the rank value of individual exemplars.

20. The system of claim 19, wherein selecting the subset of exemplars comprises selecting exemplars having the rank value above a predetermined threshold.

* * * * *